United States Patent
Hsu et al.

(10) Patent No.: US 12,417,157 B2
(45) Date of Patent: Sep. 16, 2025

(54) SYSTEM AND METHOD FOR TESTING MEMORY DEVICE

(71) Applicant: NANYA TECHNOLOGY CORPORATION, New Taipei (TW)

(72) Inventors: Jui-Chung Hsu, Taoyuan (TW); Wei Chuan Chen, Taipei (TW); Wan-Chun Fang, Taoyuan (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 98 days.

(21) Appl. No.: 18/487,551

(22) Filed: Oct. 16, 2023

(65) Prior Publication Data
US 2025/0123934 A1   Apr. 17, 2025

(51) Int. Cl.
*G06F 11/263*   (2006.01)

(52) U.S. Cl.
CPC .................................. *G06F 11/263* (2013.01)

(58) Field of Classification Search
None
See application file for complete search history.

(56) References Cited

U.S. PATENT DOCUMENTS

2023/0096291 A1   3/2023   Riley et al.

*Primary Examiner* — Guerrier Merant
(74) *Attorney, Agent, or Firm* — CKC & Partners Co., LLC (57) ABSTRACT

A system including memory devices and a tester is provided. The tester is configured to: generate a first multi-purpose command to the memory devices and a first data signal to each of a first group in the memory devices to store a first identity; generate a second multi-purpose command to the memory devices and the first data signal to each of a second group in the memory devices to store a second identity; generate a third multi-purpose command and a fourth multi-purpose command to the memory devices to select the first and second groups in the memory devices to have first and second time shifts in write leveling pulses therein separately; transmit a write datum to the memory devices for performing a write operation to the memory devices; and receive read data and compare the write datum and the read data for a test result.

8 Claims, 9 Drawing Sheets

SYSTEM AND METHOD FOR TESTING MEMORY DEVICE

BACKGROUND

Field of Invention

The present invention relates to a system and a method for testing a memory device. More particularly, the present invention relates to a system and a method for testing a memory device with identity commands.

Description of Related Art

With the rapidly developed technologies of manufacturing processes of memory devices, memory devices are designed smaller and have circuits with high density. Increasing density of circuits results in benefits in terms of speed and functionality, but errors and fabrication issues are projected to increase. It is usually necessary to test a memory device to confirm the product reliability and the yield.

SUMMARY

In some embodiments, a system is provided. The system comprises memory devices and tester. Each of the memory devices comprises a memory cell. The tester is operatively coupled to the memory devices and configured to: generate a first multi-purpose command to the memory devices and a first data signal to a first data pin of each of a first group in the memory devices to store a first identity in first mode registers of the first group in the memory devices; generate a second multi-purpose command to the memory devices and the first data signal to a second data pin of each of a second group in the memory devices to store a second identity in second mode registers of the second group in the memory devices; generate a third multi-purpose command and a fourth multi-purpose command to the memory devices to select the first and second groups in the memory devices to have first and second time shifts in write leveling pulses therein separately; transmit a write datum to data pins of the memory devices including the first data pins and the second data pins for performing a write operation to the memory devices; and receive read data from the data pins and compare the write datum and the read data for a test result.

In some embodiments, the tester generates the third and fourth multi-purpose commands to select the first and second groups in the memory devices according to the first and second identities stored therein separately.

In some embodiments, the tester is further generates a first mode register write command to the first and second groups in the memory devices to store a setting value in third mode registers of the first group in the memory devices when the first group in the memory devices are selected.

In some embodiments, when the tester generates the first data signal to the first group in the memory devices to store the first identity, the tester is further configured to generate a second data signal to the second data pin of each of the second group in the memory devices to disable the second group in the memory devices from storing the first identity.

In some embodiments, the first data signal is inverted to the second data signal.

In some embodiments, the tester comprises: a storage device configured to store a data array, in which each row of the data array includes values and a corresponding identity, in which the tester is further configured to: output signals according to the values to the data pins to select a corresponding group in the memory devices to store the corresponding identity.

In some embodiments, each value of the values is either a first logic value or a second logic value.

In some embodiments, the tester further maps the first and second identities according to the data array to generate first and second setting values respectively to store in the first and second groups in the memory devices.

In some embodiments, a method is provided. The method includes: performing a first write leveling training operation to a first memory device to get a first setting value; generating a first multi-purpose command to the first memory device and a second memory device for performing an enumerate identity operation of storing a first identity; generating a first sequence of data having a first logic value to the first memory device, in which the first memory device is disabled from performing the enumerate identity operation in response to the first sequence of data; generating a second multi-purpose command of a select identity operation to the first and second memory devices to select a corresponding memory device that stores the first identity; generating a mode register write command to the corresponding memory device to store the first setting value in a mode register of the corresponding memory device; writing a first datum to the first and second memory devices; and reading the first and second memory devices to get a second datum and a third datum respectively; and comparing the first datum with the second and third data for a test result.

In some embodiments, the method further includes: generating a second sequence of data having a second logic value to the second memory device, the second memory device performs the enumerate identity operation in response to the second sequence of data to store the identity in a mode register of the second memory device.

In some embodiments, the method further includes: storing a data array, in which a row of the data array includes a first value and a second value inverted to the first value, in which the first value is either the first logic value or the second logic value; generating a second sequence of data having the first value to the first memory device and a third sequence of data having the second value to the first memory device to select one of the first and second memory devices to store a second identity.

In some embodiments, the first setting value is a number indicating a magnitude of time to shift a write leveling pulse to start a write operation.

In some embodiments, a method is provided. The method includes: generating identity commands and data signals to store identities to memory devices, in which first and second identities in the identities are different from each other; generating mode register write commands to the memory devices to set, based on the identities, the memory devices to have time shifts in write leveling pulses, in which first and second time shifts in the time shifts correspond to the first and second identities respectively, and the first and second time shifts are different from each other; and generating a test result based on a write datum to the memory devices and read data from the memory devices.

In some embodiments, the generating the mode register write commands comprises generating a first select command to select a first group of memory devices that store the first identity from the memory devices.

In some embodiments, the generating the mode register write commands further comprises writing a first setting value to mode registers of the first group of memory devices.

In some embodiments, the generating the mode register write command further comprises generating the first setting value according to the first identity.

In some embodiments, the memory devices store the identities in mode registers in the memory devices.

In some embodiments, the generating the identity commands and the data signals comprises: generating a first data signal to a first group of memory devices in the memory devices to store the first identity.

In some embodiments, the generating the identity commands and the data signals comprises: generating a second data signal to a second group of memory devices in the memory devices to disable the second group of the memory devices from storing the first identity.

In some embodiments, the first data signal has a low logic level and the second data signal has a high logic level.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," "containing," "involving," and the like are to be understood to be open-ended, i.e., to mean including but not limited to.

Reference throughout the specification to "one embodiment," "an embodiment," or "some embodiments" means that a particular feature, structure, implementation, or characteristic described in connection with the embodiment(s) is included in at least one embodiment of the present disclosure. Thus, uses of the phrases "in one embodiment" or "in an embodiment" or "in some embodiments" in various places throughout the specification are not necessarily all referring to the same embodiment. Furthermore, the particular features, structures, implementation, or characteristics may be combined in any suitable manner in one or more embodiments.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. As used herein, the term "and/or" includes any and all combinations of one or more of the associated listed items.

As used herein, "around", "about", "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

Figure 1:
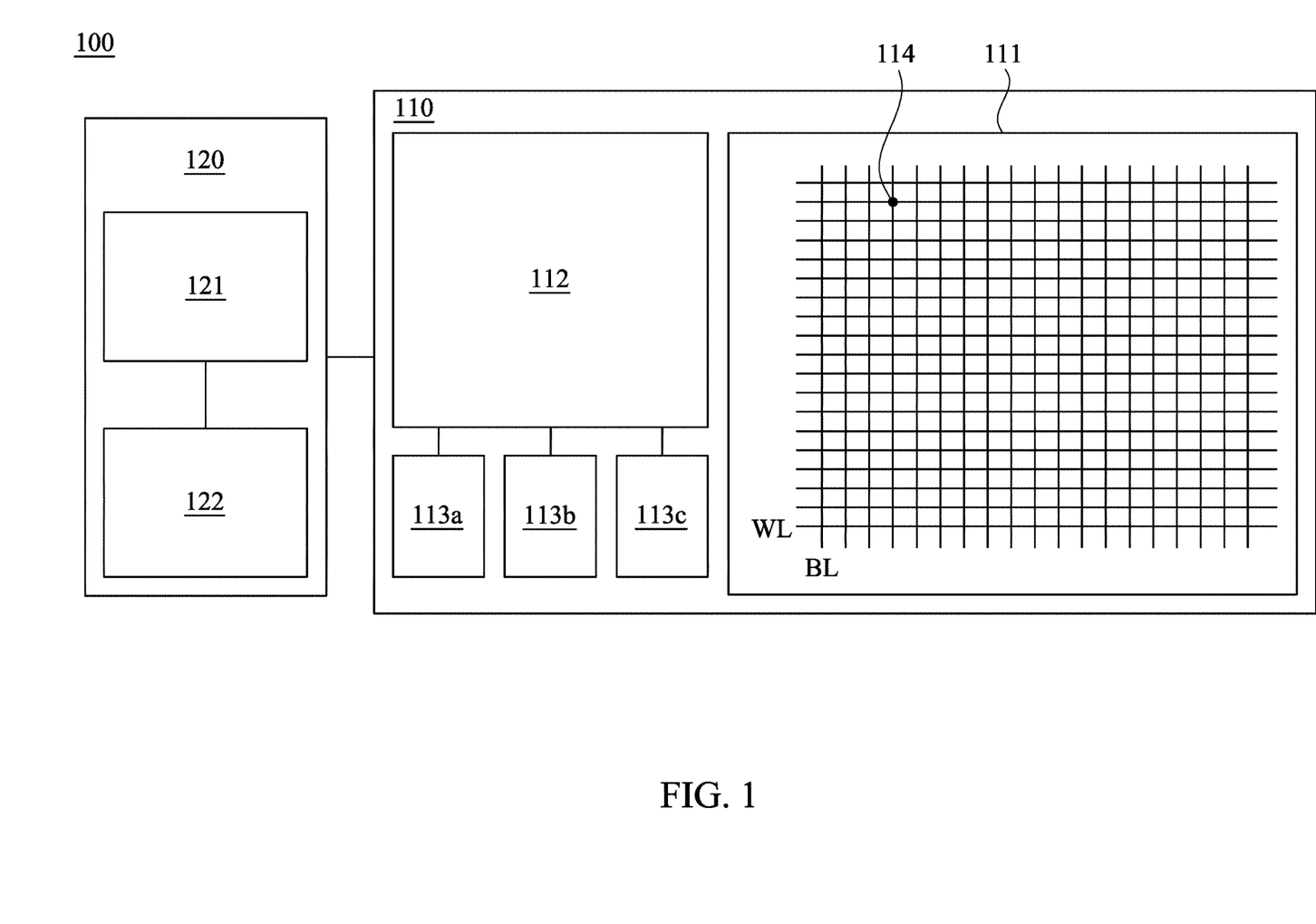
FIG. 1 is a schematic diagram of a system for testing memory in accordance with some embodiments of the present disclosure.

Reference is now made to FIG. 1. FIG. 1 is a schematic diagram of a system 100 for testing memory in accordance with some embodiments of the present disclosure. For illustration, the system 100 includes a memory device 110 and a tester 120. In some embodiments, the memory device 110 is operatively coupled to the tester 120.

In some embodiments, the memory device 110 is a memory device like a single in-line memory module (SIMM), a dual in-line memory module (DIMM), a DRAM chip, a SRAM chip, and so on. In some embodiments, the memory device 110 is a double data rate fifth-generation synchronous dynamic random-access memory (DDR5 SDRAM) chip.

As shown in FIG. 1, the memory device 110 includes a memory array 111, a control circuit 112, a mode register 113a, a mode register 113b and a mode register 113c. The control circuit 112 is coupled to the memory array 111, and the mode registers 113a-113c. The memory array 111 includes multiple memory cells 114 arranged in rows and columns. According to various embodiments, the memory cells 114 include volatile memory cells, non-volatile memory cells and combinations thereof. In some embodiments, the mode registers 113a, 113b and 113c are the first mode register (MR1), the second mode register (MR2) and the third mode register (MR3) of a DDR5 SDRAM.

According to some embodiments, the memory array 111 further includes multiple word lines WL and multiple bit lines BL. The word lines WL and the bit lines BL include conductive structures, for example, metal lines. As shown in FIG. 1, in some embodiments, each row of the memory cells 114 are coupled to a corresponding word line WL and each column of the memory cells 114 are coupled to a corresponding bit line.

In practice, the control circuit 112 performs operations (e.g., a write operation or a read operation) to the memory array 111 by controlling and/or sensing signals transmitting on the word lines WL and the bit lines BL. In some embodiments, the control circuit 112 performs operations to the memory array 111 according to commands (e.g., commands from the tester 120) received by the memory device 110. For example, the tester 120 generates a write command corresponding to a memory address to the memory device 110, and the control circuit 112 stores write data to the memory cell 114 corresponding to the memory address through the word lines WL and the bit lines BL. In some embodiments, the control circuit 112 includes a row address decoder, a column address decoder and a sense amplifier.

In some embodiments, the control circuit 112 performs operations to the mode register 113a and the mode register 113b. In some embodiments, the control circuit 112 performs operations to the mode register 113a and the mode register 113b according to commands (e.g., commands from the tester 120) received by the memory device 110. For example, the tester 120 generates a mode register write (MRW) command of the mode register 113a to the memory device 110, and the control circuit 112 to write data to the mode register 113a according to the MRW command.

According to some embodiments, the tester 120 is a memory test machine, for example, a dynamic random-access memory (DRAM) test machine or a static random-access memory (SRAM) test machine. In some embodiments, the tester 120 is a programmable test machine. As shown in FIG. 1, the tester 120 includes a processor 121 and a storage device 122. In some embodiments, the processor 121 is coupled to the storage device 122.

According to various embodiments, the processor 121 is, for example, a central processing unit (CPU), a programmable general-purpose or special-purpose micro control unit (MCU), a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA) or other similar components or a combination of the above components.

According to some embodiments, the storage device 122 includes an universal buffer memory (UBM). In some embodiments, the UBM stores data to output to the memory devices 110.

The system 100 depicted in FIG. 1 is given for illustrative purposes. Various implements of the system 100 are within the contemplated scope of the present disclosure. For example, in some embodiments, the memory array 111 is a three dimensional memory array.

Figure 2:
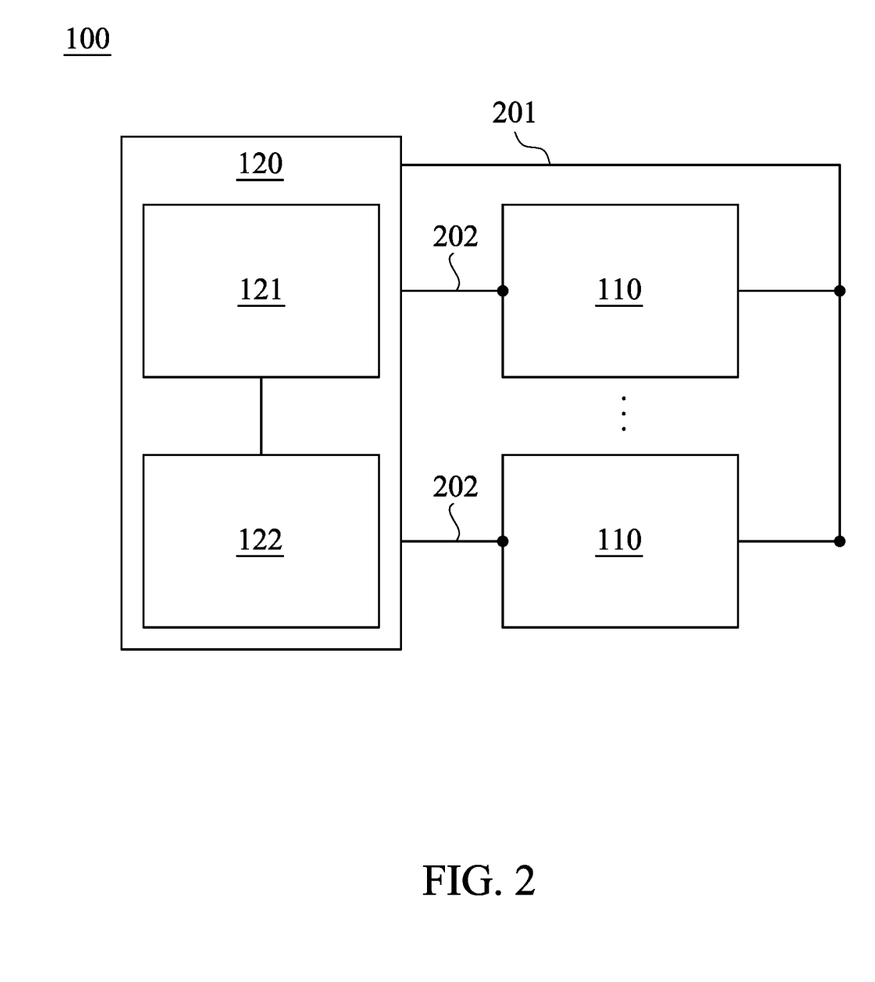
FIG. 2 is a schematic diagram of the system in accordance with some embodiments of the present disclosure.

Reference is now made to FIG. 2. FIG. 2 is a schematic diagram of the system 100 in accordance with some embodiments of the present disclosure. With respect to the embodiments of FIG. 1, like elements in FIG. 2 are designated with the same reference numbers for ease of understanding. The specific operations of similar elements, which are already discussed in detail in above paragraphs, are omitted herein for the sake of brevity.

For illustration, in some embodiments, the system 100 further includes multiple memory devices 110, a bus 201 and multiple data lines/pins 202. As shown in FIG. 1, the tester 120 is coupled to the memory devices 110 through the bus 201. In addition, the tester 120 is coupled to each memory device 110 through a data line/pin 202 thereof separately.

In practice, the tester 120 transmits command/address signals to the memory devices 110 through the bus 201 and transmits data signals DQ to the memory devices 110 through data lines/pins 202. For example, in order to control the memory device 110 to perform a write operation, the tester 120 outputs a write command to the memory device 110 through the bus 201 and outputs write data to the memory device 110 through the data line/pin 202.

The system 100 depicted in FIG. 2 is given for illustrative purposes. Various implements of the system 100 are within the contemplated scope of the present disclosure. For example, in some embodiments, one memory device 110 includes multiple data lines/pins 202 coupled to the tester 120.

In some embodiments, the tester 120 performs a test to the memory devices 110 to detect functional defects. In some embodiments, the tester 120 performs the test to the memory devices 110 with the memory devices 110 having different settings, for example, different write leveling internal cycle alignment (WICA) settings. In some embodiments, during a write operation, the control circuit 112 start writing data to memory array 111 in response to an internal write leveling (internal WL) pulse (i.e., an internal WL signal generated within the control circuit 112 pulled high). In some embodiments, a WICA setting value is configured to indicate a time shift of the internal WL pulse.

In some embodiments, the WICA setting value is determined through an internal write leveling process, also referred to as a data strobe (DQS) training to ensure that DQS signals to the memory device 110 are timed properly. Further details about the WICA setting and the internal write leveling process to the memory devices 110 are described in the following paragraphs with reference to FIGS. 3A and 3B.

Figure 3A:
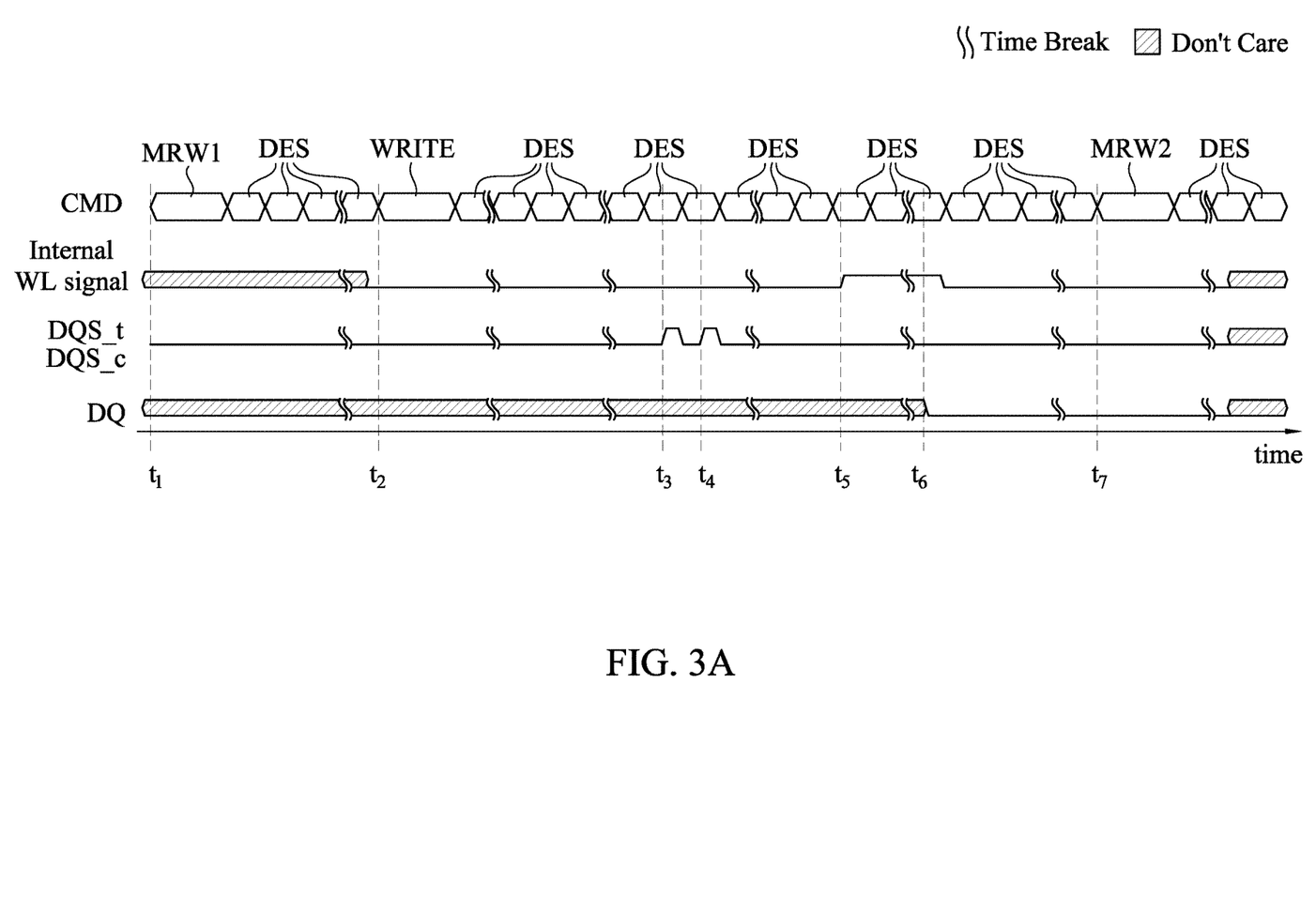
FIG. 3A is a waveform diagram of an example of an internal write leveling process in accordance with some embodiments of the present disclosure.
Figure 3B:
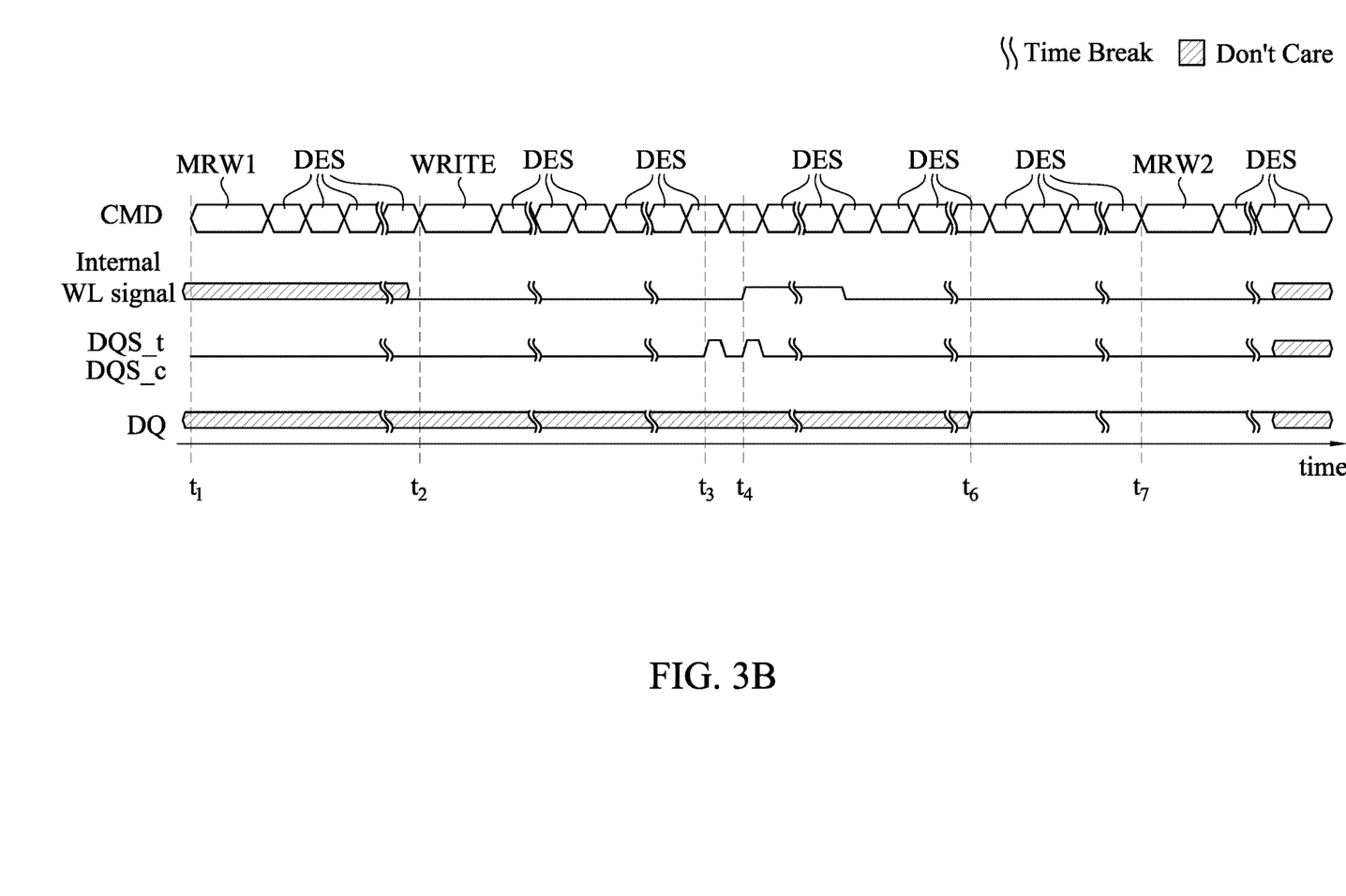
FIG. 3B is a waveform diagram of an example of an internal write leveling process in accordance with some embodiments of the present disclosure.

Reference is now made to FIGS. 3A and 3B. FIGS. 3A and 3B are waveform diagrams of an example of an internal write leveling process in accordance with some embodiments of the present disclosure. With respect to the embodiments of FIGS. 1-2, like elements in FIGS. 3A and 3B are designated with the same reference numbers for ease of understanding. The specific operations of similar elements, which are already discussed in detail in above paragraphs, are omitted herein for the sake of brevity.

For illustration, as shown in FIG. 3A, at a time $t_1$, the tester 120 outputs a mode register write command MRW1 to write a value (e.g., a logic one) to the mode register 113b to enable a write leveling mode. After the write leveling mode is enabled, the tester 120 outputs a write command WRITE to the memory device 110 at a time $t_2$ and generate a DQS signals toggle (signals DQS_t and DQS_c crossing each other every unit interval) at a time $t_3$. In response to the write command, the control circuit 112 pulls high the internal WL signal to generate the internal WL pulse at a time $t_5$. In some embodiments, the tester 120 generates device deselect commands DES between mode register write commands and write commands. The memory device 110 performs no operation in response to the device deselect commands DES.

According to some embodiments, the internal write leveling process is performed to align the internal write leveling pulse with the DQS signals toggle. In practice, the control circuit 112 utilizes the signal DQS_t and the signal DQS_c to sample the internal write leveling signal to get a sampled value and whether the internal write leveling pulse aligned with the DQS signals toggle can be determined according to the sampled value.

For example, in some embodiments as depicted in FIG. 3A, the internal write leveling process is performed to align the internal write leveling pulse with a third crossing point of the DQS signals toggle (at the time $t_4$); the control circuit 112 samples the internal write leveling signal when the signal DQS_t and the signal DQS_c cross each other for the third time during the internal write leveling process and gets a sampled value logic zero. Then, at a time to, the memory device 110 pull low the DQ signal at the data line/pin 202 to have the sampled value zero. In some embodiments, the tester 120 receives the DQ signal and determines that the internal write leveling pulse and the DQS signals toggle are not aligned according to the value logic zero of the DQ signal. In some embodiments, at a time $t_7$ after the sampled value is outputted, the tester 120 outputs a mode register write command MRW2 to write a value (e.g., a logic zero) to the mode register 113b to end the write leveling mode.

According to some embodiments, the tester 120 controls the control circuit 112 to shift the internal write leveling pulse and repeats the operations described above with reference to FIG. 3A until the internal write leveling pulse is aligned with the DQS signals toggle. FIG. 3B depicts an example of the internal write leveling pulse aligned with the DQS signals toggle. As shown in 3B, the sampled value of the internal write leveling pulse at the time $t_4$ is logic one and the memory device 110 pull high the DQ signal at the data line/pin 202 to have the logic value one at the time to.

The waveforms of the internal write leveling process depicted in FIGS. 3A and 3B are given for illustrative purposes. Various implements of the waveforms of the internal write leveling process are within the contemplated scope of the present disclosure. For example, in some embodiments, the tester 120 outputs a mode register write command between the mode register write command MRW1 and the write command WRITE to set the WICA setting value in the mode register 113c.

In some embodiments, the setting values (e.g., WICA setting values) of different memory devices 110 vary from each other. In some embodiments, the setting value varies according to the operating voltage and/or the system clock cycle time (tCK) of the memory device 110. According to some embodiments, the tester 120 writes different setting values to different memory devices 110 before performing a test to the memory devices 110.

Figure 4:
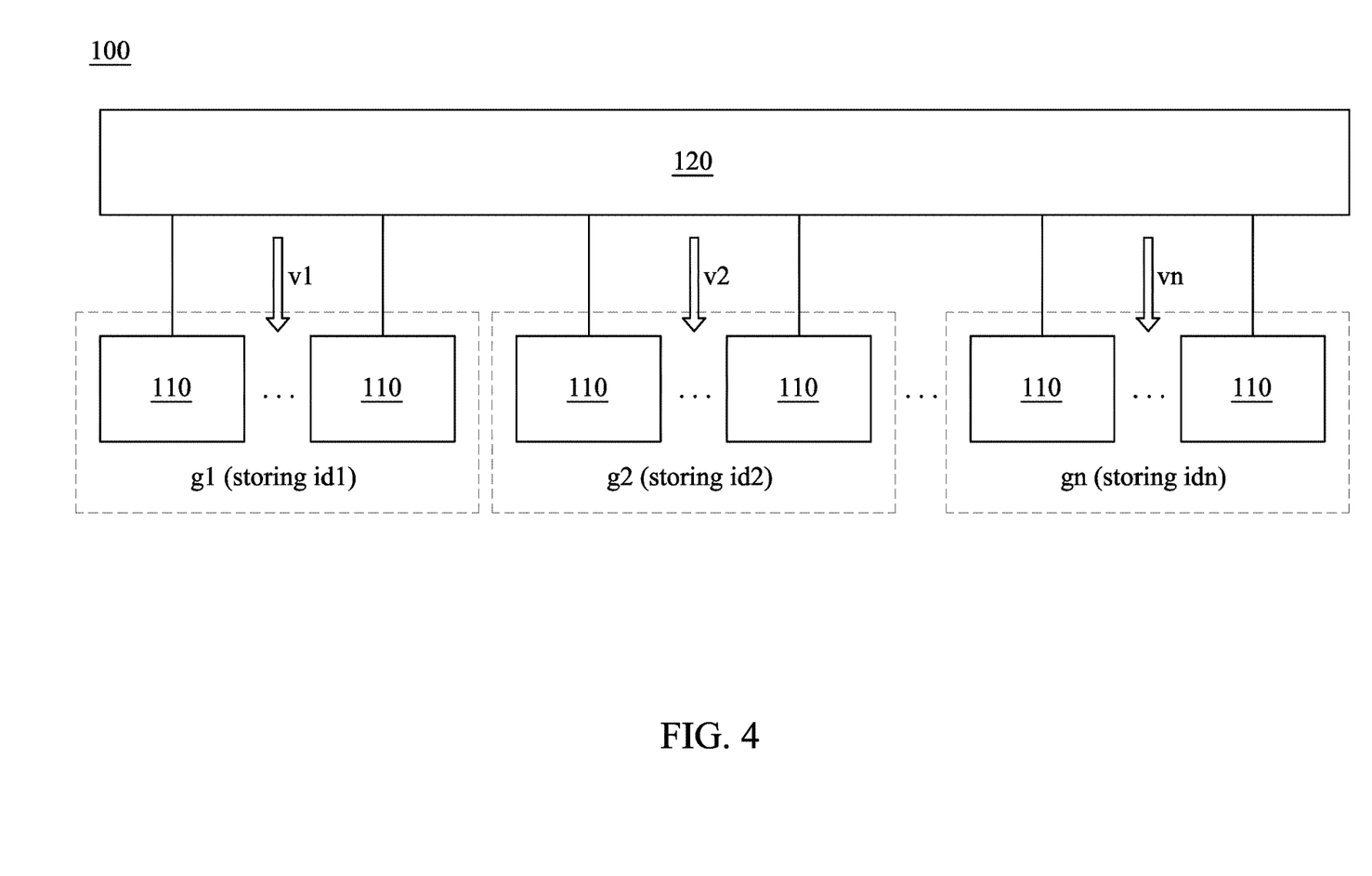
FIG. 4 is a schematic diagram of the system in accordance with some embodiments of the present disclosure.

Reference is now made to FIG. 4. FIG. 4 is a schematic diagram of the system 100 in accordance with some embodiments of the present disclosure. With respect to the embodiments of FIGS. 1-2 and 3A-3B, like elements in FIG. 4 are designated with the same reference numbers for ease of understanding. The specific operations of similar elements, which are already discussed in detail in above paragraphs, are omitted herein for the sake of brevity.

For illustration, the tester 120 performs a test to multiple memory devices 110 including groups g1-gn of memory devices 110. Before performing the test, the tester 120 write a setting value v1 (e.g., number 3 indicating a shift of 3 tCK to the internal WL pulse) to mode registers of the group g1, write a setting value v2 (e.g., number 4 indicating a shift of 4 tCK to the internal WL pulse) to mode registers of the group g2 . . . and write a setting value vn (e.g., number 5 indicating a shift of 5 tCK to the internal WL pulse) to mode registers of the group gn.

In practice, the tester 120 performs per DRAM addressability (PDA) operations to set the memory devices 110 separately (i.e., write different setting values to different group of memory devices 110).

The PDA operations include enumerate identity (ID) operation and select ID operation. According to some embodiments, in order to write different setting values (v1-vn) to different groups of memory devices 110 (the groups g1-gn), the tester 120 writes different IDs (id1-idn) to the different groups of memory devices 100 (the groups g1-gn) through the enumerate identity operation.

Then, the tester 120 writes the different setting values (v1-vn) to mode registers of the different groups of memory devices 110 that store the IDs (id1-idn) through select ID operations. For example, during a select ID operation, the group g1 is selected according to the ID id1 stored in the group g1, and the tester 120 write the setting value v1 to the selected group g1. Further details about the enumerate ID operation and the select ID operation to the memory devices 110 are described in the following paragraphs with reference to FIGS. 5-7.

The system 100 depicted in FIG. 4 is given for illustrative purposes. Various implements of the system 100 are within the contemplated scope of the present disclosure. For example, in some embodiments, the memory devices 110 in a group (e.g., the group g1) are not all adjacent. For example, there may be a memory device 110 of the group g2 between two memory devices 110 of the group g1.

Figure 5:
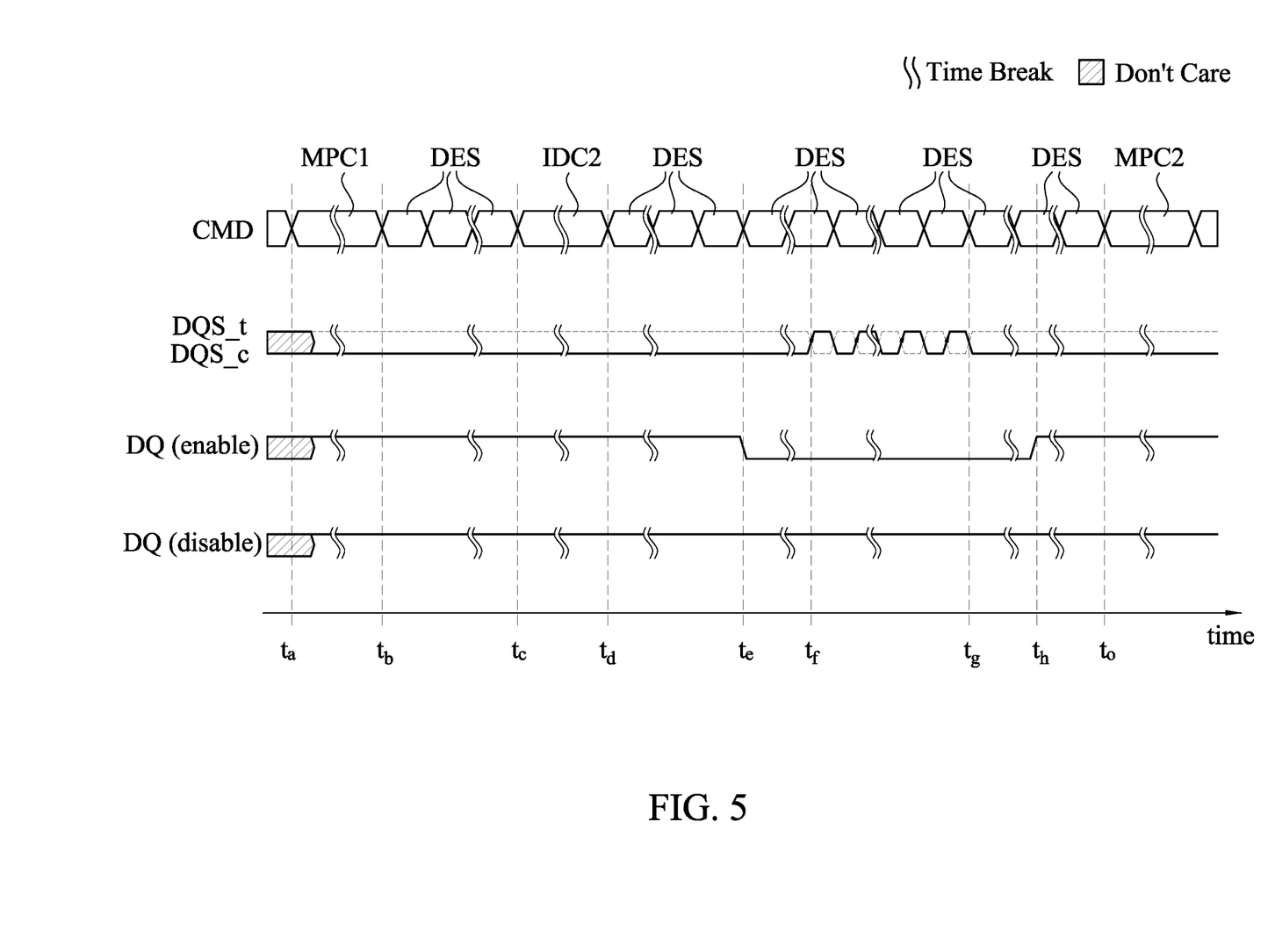
FIG. 5 is a waveform diagram of an example of enumerating ID operation in accordance with some embodiments of the present disclosure.

Reference is now made to FIG. 5. FIG. 5 is a waveform diagram of an example of enumerating ID operation in accordance with some embodiments of the present disclosure. With respect to the embodiments of FIGS. 1-2, 3A-3B and 4, like elements in FIG. 5 are designated with the same reference numbers for ease of understanding. The specific operations of similar elements, which are already discussed in detail in above paragraphs, are omitted herein for the sake of brevity.

For illustration, at a time $t_a$, the tester 120 generates a multi-purpose command MPC1 to the memory devices 110 to perform a PDA enumerate programming entry operation (entering a PDA enumerate programming mode). Specifically speaking, the tester 120 generates a MPC with opcode indicating the PDA enumerate programming entry operation to the memory devices 110. In some embodiments, the tester 120 generates MPC with opcode indicating the PDA enumerate programming entry operation through the bus 201 to all memory devices 110 coupled thereto. According to some embodiments, during the PDA enumerate programming mode, the memory device 110 is enabled to perform an enumerate ID operation to store an ID in response to a multi-purpose command with opcode indicating an enumerate ID operation (also referred to as an ID command).

Then, from a time $t_b$ to a time $t_c$ after the multi-purpose command MPC1 with opcode indicating the PDA enumerate programming entry operation is transmitted, the tester 120 generate the device deselect commands DES and the memory devices 110 perform no operation in response to the device deselect commands DES.

At the time $t_c$, the tester 120 generates a multi-purpose command with opcode indicating an enumerate ID operation (ID command IDC1) to the memory devices through the bus 201 and at a time td after the time $t_c$, the tester 120 generate a DQS signals toggle to the memory devices 110. In some embodiments, the ID command IDC1 includes an ID and the control circuit 112 performs the enumerate ID operation to store the ID in response to the ID command IDC1 and the DQS signals toggle. During the enumerate ID operation, the control circuit 112 writes the ID to the mode register 113a. In some embodiments, the control circuit 112 writes the ID to the mode register 113a during the period of the DQS signals toggle (e.g., from the time $t_f$ to the time $t_g$).

In some embodiments, the control circuit 112 performs the enumerate ID operation in response to not only the ID command and the DQS signal toggle but also the data signal DQ at the data line/pin 202 having a first logic level (e.g., a sequence of data having logic value zero). According to some embodiments, during the period of the DQS signals toggle, the control circuit 112 stops writing the ID to the mode register when the data signal DQ has a second logic level inverted to the first logic level (e.g., having a logic value one). Alternatively speaking, the logic level at the data pin DQ has to remain low (e.g., remaining the logic value zero) during the period of the DQS signals toggle to write the ID to the mode register.

In some embodiments, in order to enable the control circuit 112 to perform the enumerate ID operation, the tester 120 generates a sequence of logic values zero that start before the period of the DQS signals toggle and end after the period of the DQS signals toggle to the memory device 110. For example, as shown in FIG. 5, the tester 120 pull low the logic level of the data signal DQ (annotated with "enable") from a time $t_c$ before the time $t_f$ to a time $t_h$ after the time $t_g$. In some embodiments, the time $t_c$ is three tCK earlier than the time $t_f$ and the time $t_h$ is three tCK later than the time $t_g$.

In contrast, in order to disable the control circuit 112 from performing the enumerate ID operation, the tester 120 generates a sequence of logic values one that start before the period of the DQS signals toggle and end after the period of the DQS signals toggle to the memory device 110. For example, as shown in FIG. 5, the tester 120 maintains the data signal DQ (annotated with "disable") having a high logic level from a time $t_c$ before the time $t_f$ to a time $t_h$ after the time $t_g$.

In application, the tester 120 generates different data signals to the memory devices 110 to select a group of memory devices 110 to perform the enumerate ID operation. For example, after generating the ID command IDC1 to the memory devices (including the groups g1-gn), the tester 120 then generates the data signal DQ (annotated with "enable") to the group g1 and generates the data signal DQ (annotated with "disable") to the rest groups (the groups g2-gn). In this case, the memory devices 110 in the group g1 are enabled to write the ID of the ID command IDC1 to mode registers and the memory devices 110 in the rest groups (the groups g2-gn) are disabled to write the ID to mode registers.

In some embodiments, the tester 120 generates the different data signals according to values in a data array stored in the storage device 122. Each row of the data array includes an ID and values (one or zero) corresponding to each memory device 110. For example, for the row of ID id1, the values corresponding to the group g1 of memory devices 110 are zero and the values corresponding to the rest of memory devices 110 are one. The tester 120 generates a sequence of logic values zero/one from the time $t_e$ to the time $t_h$ to a memory device 110 when the value in the row corresponding to the memory device 110 is zero/one.

At a time to after the enumerate ID operation, the tester 120 generate a multi-purpose command MPC2 to the memory devices 110 to perform a PDA enumerate programming exit operation to exit the PDA enumerate programming mode. After exiting the PDA enumerate programming mode, the memory device 110 are disabled from performing an enumerate ID operation.

The waveforms diagram of enumerating ID depicted in FIG. 5 is given for illustrative purposes. Various implements of the waveforms diagram of enumerating ID operation are within the contemplated scope of the present disclosure. For example, in some embodiments, the tester 120 generates more ID commands before the multi-purpose command MPC2.

Figure 6:
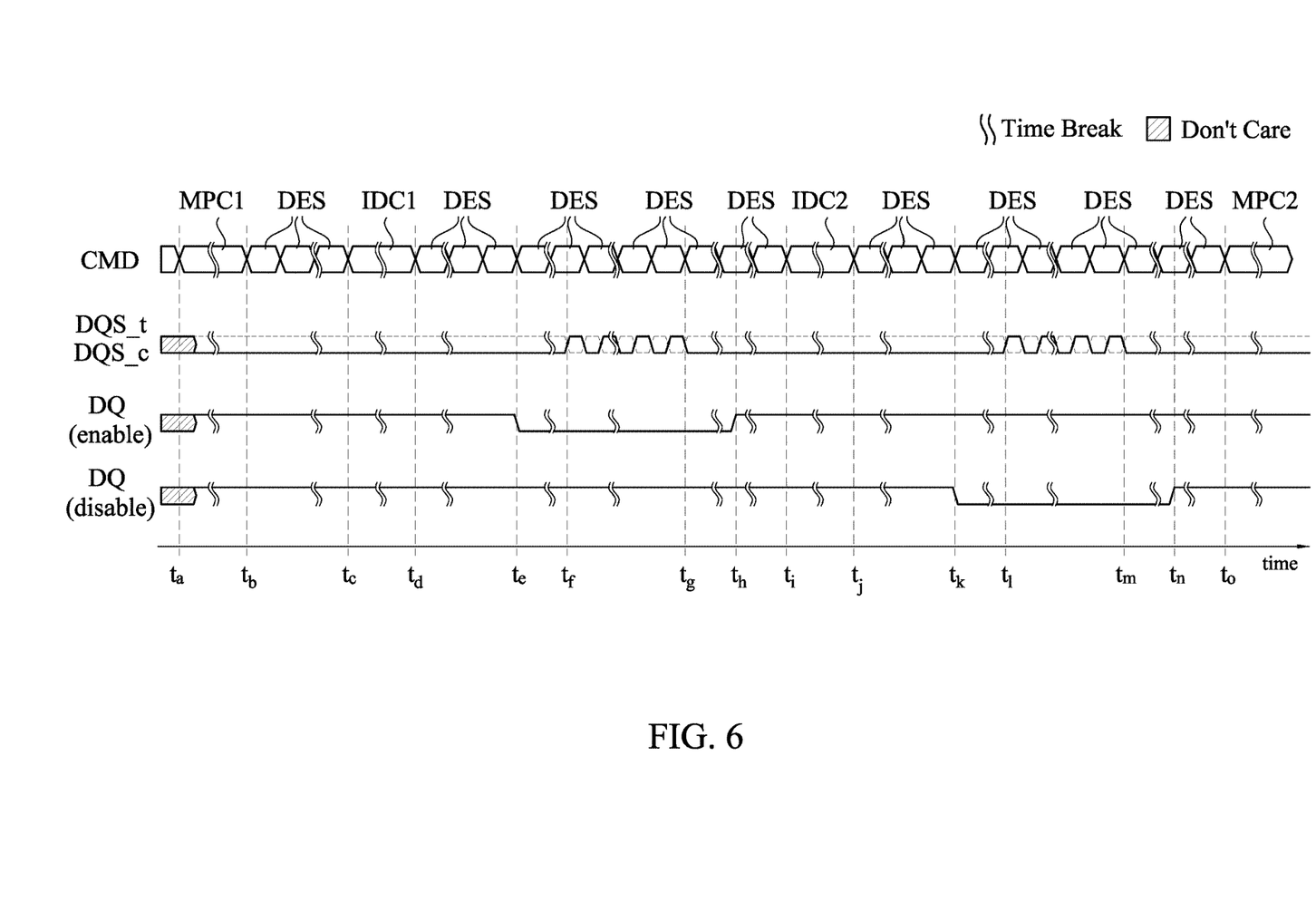
FIG. 6 is a waveform diagram of an example of enumerating ID operation in accordance with some embodiments of the present disclosure.

Reference is now made to FIG. 6. FIG. 6 is a waveform diagram of an example of enumerating ID operation in accordance with some embodiments of the present disclosure. With respect to the embodiments of FIGS. 1-2, 3A-3B and 4-5, like elements in FIG. 6 are designated with the same reference numbers for ease of understanding. The specific operations of similar elements, which are already discussed in detail in above paragraphs, are omitted herein for the sake of brevity.

In some embodiments, the tester 120 repeats generating different ID commands to the memory devices 110 to write different IDs to different groups (e.g., the groups g1-gn) of the memory devices 110. For example, as shown in FIG. 6, the tester 120 generates the ID command IDC1 at the time $t_c$ to write a ID to the group g1 of the memory devices and generate another ID command IDC2 at a time $t_i$ after the time $t_c$ to write another ID to the group g2 of the memory devices.

Specifically, at the time $t_c$, the tester 120 generates the ID command IDC1 to the memory devices 110 and the tester 120 generates a sequence of logic values zero to the group g1 of the memory devices 110 to enable the group g1 to store the ID of the ID command IDC1 (the signal DQ annotated with "g1" from the time $t_e$ to the time $t_h$) and generates a sequence of logic values one (e.g., the signal DQ annotated with "g2" from the time $t_e$ to the time $t_h$) to the rest of the memory devices 110 (e.g., the groups g2-gn) to disable the rest of the memory devices 110 from storing the ID of the ID command IDC1.

Similarly, at a time $t_i$ after the time $t_h$, the tester 120 generates the ID command IDC2 to the memory devices 110 and the tester 120 generates a sequence of logic values zero to the group g2 of the memory devices 110 to enable the group g2 to store the ID of the ID command IDC2 (the signal DQ annotated with "g2" from the time $t_k$ to the time $t_n$) and generates a sequence of logic values one (e.g., the signal DQ annotated with "g1" from the time $t_k$ to the time $t_n$) to the rest of the memory devices 110 (e.g., the groups g1, g3-gn) to disable the rest of the memory devices 110 from storing the ID of the ID command IDC2.

The waveforms diagram of enumerating ID operation depicted in FIG. 6 is given for illustrative purposes. Various implements of the waveforms diagram of enumerating ID operation are within the contemplated scope of the present disclosure. For example, in some embodiments, the tester 120 generates different ID commands to write different IDs to the groups g3-gn separately before the multi-purpose command MPC2.

After generating the multi-purpose command MPC2 to exit PDA enumerate programming mode, the tester 120 repeats generating multi-purpose commands including opcode indicating select ID operation (also referred to as select commands) to the memory devices 110 to store different setting values to different group of memory device 110. Further details about the select commands are described in the following paragraphs with reference to FIG. 6.

Figure 7:
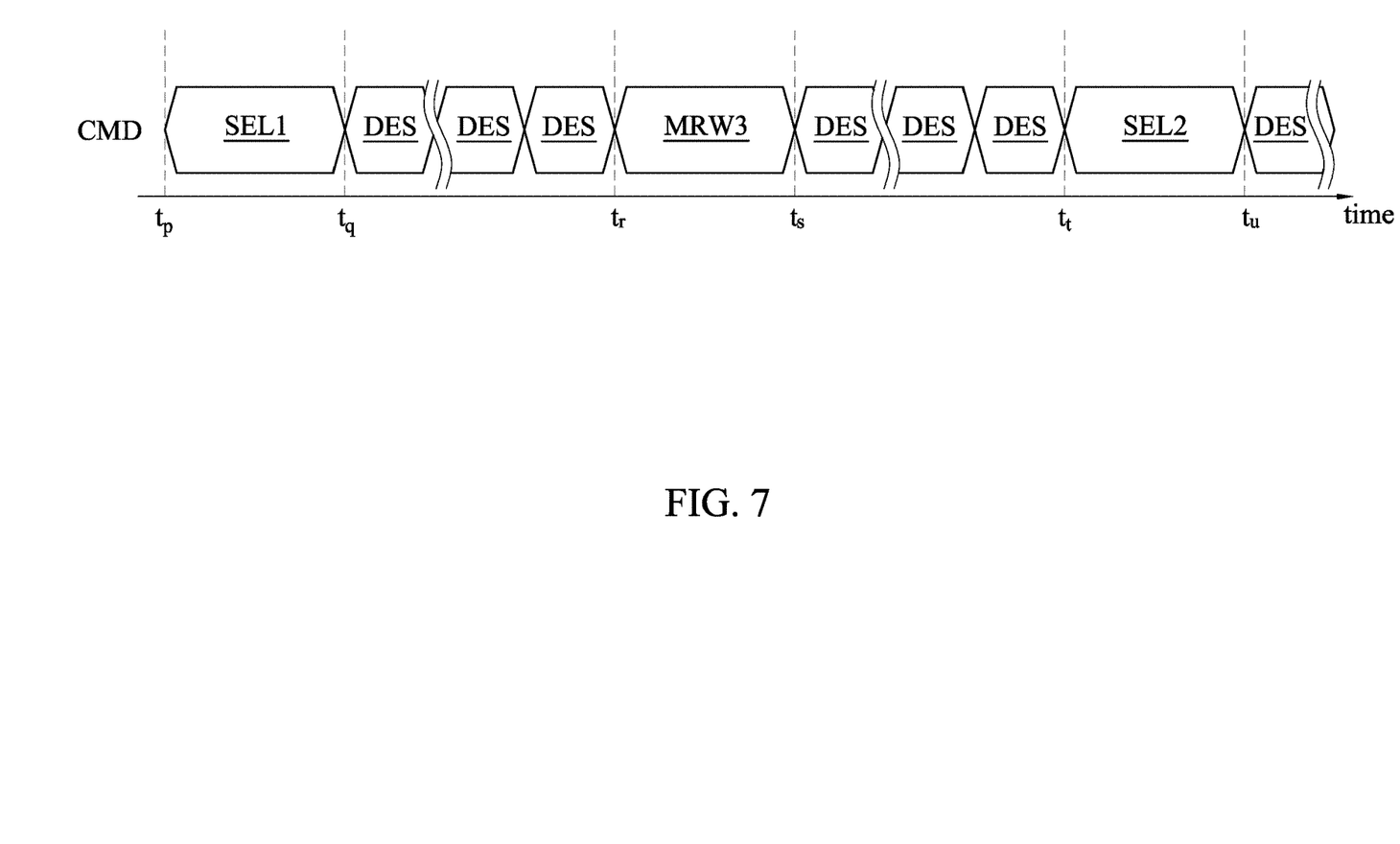
FIG. 7 is a waveform diagram of an example of select ID operation in accordance with some embodiments of the present disclosure.

Reference is now made to FIG. 7. FIG. 7 is a waveform diagram of an example of select ID operation in accordance with some embodiments of the present disclosure. With respect to the embodiments of FIGS. 1-2, 3A-3B and 4-6, like elements in FIG. 7 are designated with the same reference numbers for ease of understanding. The specific operations of similar elements, which are already discussed in detail in above paragraphs, are omitted herein for the sake of brevity.

For illustration, at a time $t_p$ after the memory devices 110 exit the PDA enumerate programming mode, the tester 120 generates a select command SEL1 indicating an ID to the memory devices 110. From a time $t_q$ to a time $t_r$, the tester 120 generates the device deselect commands DES to the memory devices. Then, at the time $t_r$, the tester 120 generates a mode register write command MRW3 to the memory devices 110. According to some embodiments, after receiving the select command SEL1, only the memory devices 110 storing ID that is the same as the ID of the select command SEL in the mode register 113a are enabled to perform a mode register write operation. For example, when the ID of the select command SEL1 is "0001", the control circuit 112 compares "0001" with the ID that is stored in the mode register 113a through the enumerate ID command. When the ID that stored in the mode register 113a is the same as "0001", the control circuit 112 performs a mode register write operation in response to the mode register write command MRW3.

In some embodiments, the tester 120 select a group (e.g., the group g1) from the memory device 110 through the select command SEL1 and write a setting value to the group through the mode register write command MRW3. For example, the tester 120 generates the select command SEL1 including an ID equal to the ID stored in the group g1 and generate the mode register write command MRW3 to write the setting value v1 to the mode registers 113c of the group g1.

After the setting values are written to the mode registers 113c of the memory devices 110, the tester 120 generates a select command SEL2 to the memory devices, in which the select command SEL2 indicating selecting all IDs. In other words, after the memory devices 110 receive the select command SEL2, each memory device 110 will perform a mode register write operation in response to a mode register write command no matter what ID is stored in the memory device 110.

The waveforms diagram of select ID operation depicted in FIG. 7 is given for illustrative purposes. Various implements of the waveforms diagram of select ID operation are within the contemplated scope of the present disclosure. For example, in some embodiments, the tester 120 generates different select commands to select the groups g3-gn according to IDs id1-idn stored therein separately before the select command SEL2.

In some embodiments, after setting the memory devices 110 (writing setting values v1-vn to the groups g1-gn), the tester 120 performs the test to the memory devices 110 for defect detection. During the test, the tester 120 generates a write command to the memory devices 110. The tester 120 outputs a datum to the memory devices through the data lines/pins 202 thereof to write the datum to the memory devices 110. Then, the tester generates read commands to the memory devices 110 to retrieve read data through the data lines/pins 202. In some embodiments, the write and read commands include the same memory address. In some embodiments, the tester 120 compares the write datum to a memory device 110 and the read datum retrieved from the memory device 110 to determine whether the memory device 110 are defective. In some embodiments, when the write datum to a memory device 110 and the read datum retrieved from the memory device 110 are matched, the tester 120 determines that the memory device 110 functions normally.

Figure 8:
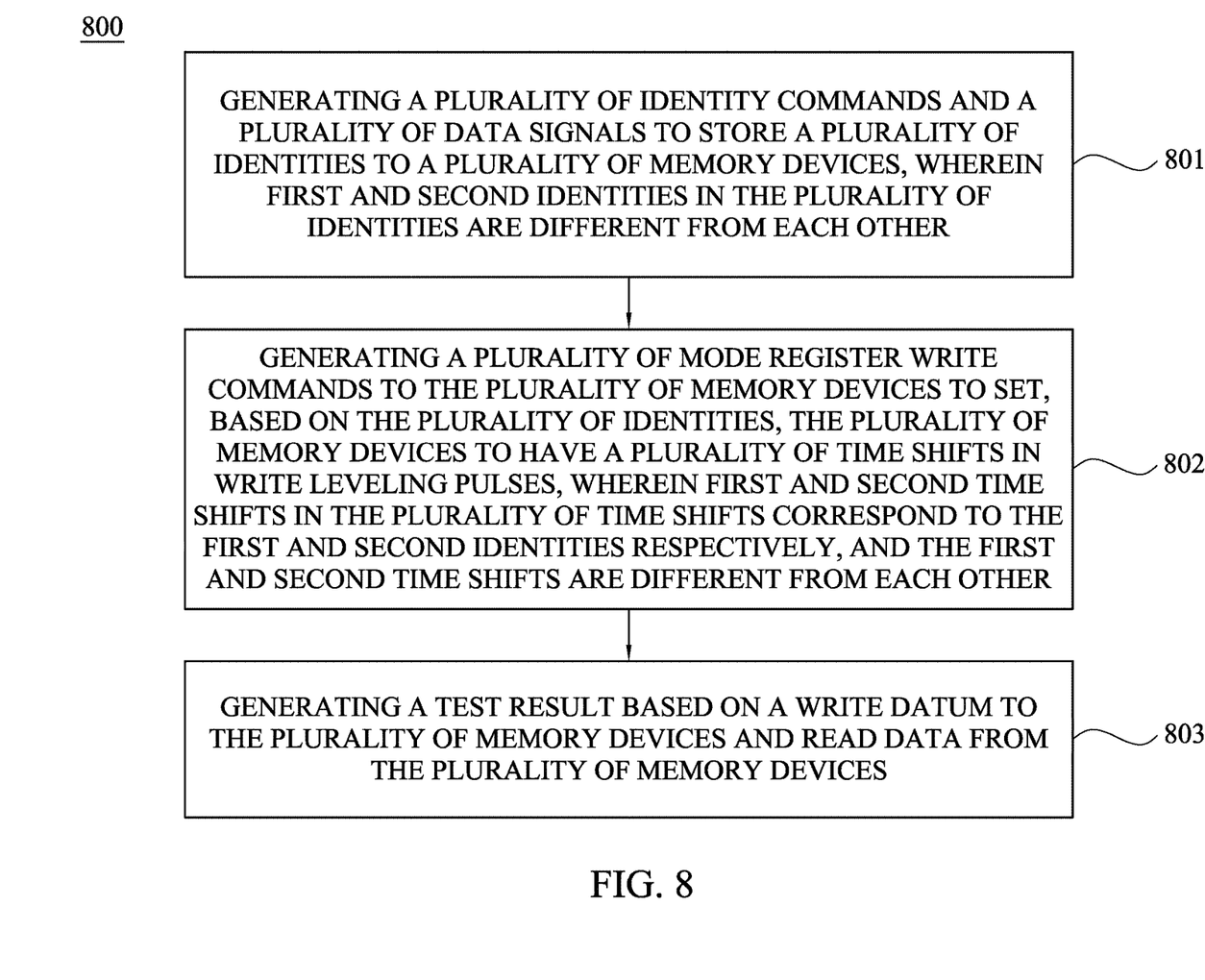
FIG. 8 is flowchart of a method in accordance with some embodiments of the present disclosure.

Reference is now made to FIG. 8. FIG. 8 is flowchart of a method 800 in accordance with some embodiments of the present disclosure. It is understood that additional operations can be provided before, during, and after the processes shown by FIG. 8, and some of the operations described below can be replaced or eliminated, for additional embodiments of the method 600. At least some operations in the method 800 can be utilized to operate the system 100 in FIGS. 1-2 and 4. The method 800 includes operations 801-803 which would be discussed below.

In operation 801, the tester 120 generates the ID commands and the DQ signals to store IDs to the memory devices 110. In some embodiments, the IDs include at least two IDs (e.g., the IDs id1 and id2) that are different from each other.

In some embodiments, the memory devices 110 store the IDs in the mode registers 113c of the memory devices.

In some embodiments, the tester 120 further generates a data signal (e.g., the data signal DQ annotated with "enable" in FIG. 5 from the time $t_e$ to the time $t_h$) to the group g1 of memory devices to store the ID id1.

In some embodiments, the tester 120 further generates another data signal (e.g., the data signal DQ annotated with "disable" in FIG. 5 from the time $t_e$ to the time $t_h$) to the group g2 of memory devices to disable the group g2 from storing the ID id1.

In some embodiments, the data signal (e.g., the data signal DQ annotated with "enable" in FIG. 5 from the time $t_e$ to the time $t_h$) has a low logic level and the another data signal (e.g., the data signal DQ annotated with "disable" in FIG. 5 from the time $t_e$ to the time $t_h$) has a high logic level.

In operation 802, the tester 120 generates mode register write commands (e.g., the mode register write command MRW3) to the memory devices 110 to set, based on the IDs, the memory devices 110 to have time shifts in the internal WL pulses, in which at least two time shifts corresponding to the at least two IDs are different from each other.

In some embodiments, before generating the mode register write commands in the operation 802, the tester 120 generates a select command (e.g., the select command SEL1) to select the group g1 that store the ID id1 from the groups g1-gn of the memory devices 110.

In some embodiments, the tester 120 generates the mode register write commands to write setting values to the memory devices 110. For example, the tester generates the mode register write command MRW3 to write the setting value v1 to the mode registers 113c of the group g1 of memory devices 110.

In some embodiments, the tester 120 generates the setting value v1-vn for the mode register write command according to the IDs id1-idn through a scramble function, in which the scramble function maps the IDs id1-idn to the setting values v1-vn. For example, after the tester 120 generates the select command of the ID id1, the tester 120 generate the setting value v1 according to the ID id1 through the scramble function. Then, the tester 120 generate the mode register write command of the setting value v1 to the memory devices 110. In some embodiments, the scramble function maps the IDs id1-idn to the setting values v1-vn according to the data array in the storage device 122. For example, the ID id1 and the setting value v1 is stored in the same row of the data array.

In operation 803, the tester 120 generates a test result based on a write datum to the memory devices 110 and read data from the memory devices 110.

As described above, the present disclosure provides test system and method for testing memory devices with different setting values. By outputting different data signals to different memory device, the tester select some of the memory devices to perform a PDA enumerate ID operation while the other of the memory devices perform no operation. In this way, different IDs are written to different memory devices effectively, and thus, the tester is able to write different setting values to the memory devices according to the IDs. The present system and method help improve the test performance when each memory device can be set with a most suitable setting value.

While the disclosure has been described by way of example(s) and in terms of the preferred embodiment(s), it is to be understood that the disclosure is not limited thereto. Those skilled in the art may make various changes, substitutions, and alterations herein without departing from the spirit and scope of the present disclosure. In view of the foregoing, it is intended that the present invention cover modifications and variations of this invention provided they fall within the scope of the following claims.

What is claimed is:

1. A system, comprising:
   a plurality of memory devices, wherein each of the plurality of memory devices comprises a memory cell; and
   a tester operatively coupled to the plurality of memory devices and configured to:
   generate a first multi-purpose command to the plurality of memory devices and a first data signal to a first data pin of each of a first group in the plurality of memory devices to store a first identity in a plurality of first mode registers of the first group in the plurality of memory devices;
   generate a second multi-purpose command to the plurality of memory devices and the first data signal to a second data pin of each of a second group in the plurality of memory devices to store a second identity in a plurality of second mode registers of the second group in the plurality of memory devices;
   generate a third multi-purpose command and a fourth multi-purpose command to the plurality of memory devices to select the first and second groups in the plurality of memory devices to have first and second time shifts in write leveling pulses therein separately;
   transmit a write datum to a plurality of data pins of the plurality of memory devices including the first data pins and the second data pins for performing a write operation to the plurality of memory devices; and
   receive read data from the data pins and compare the write datum and the read data for a test result.

2. The system of claim 1, wherein the tester is further configured to generate the third and fourth multi-purpose commands to select the first and second groups in the plurality of memory devices according to the first and second identities stored therein separately.

3. The system of claim 1, wherein the tester is further configured to generate a first mode register write command to the first and second groups in the plurality of memory devices to store a setting value in a plurality of third mode registers of the first group in the plurality of memory devices when the first group in the plurality of memory devices are selected.

4. The system of claim 1, wherein when the tester generates the first data signal to the first group in the plurality of memory devices to store the first identity, the tester is further configured to generate a second data signal to the second data pin of each of the second group in the plurality of memory devices to disable the second group in the plurality of memory devices from storing the first identity.

5. The system of claim 4, wherein the first data signal is inverted to the second data signal.

6. The system of claim 1, wherein the tester comprises:
   a storage device configured to store a data array, wherein each row of the data array includes a plurality of values and a corresponding identity,
   wherein the tester is further configured to:
   output a plurality of signals according to the plurality of values to the data pins to select a corresponding group in the plurality of memory devices to store the corresponding identity.

7. The system of claim 6, wherein each value of the plurality of values is either a first logic value or a second logic value.

8. The system of claim 6, wherein the tester is further configured to map the first and second identities according to the data array to generate first and second setting values respectively to store in the first and second groups in the plurality of memory devices.

* * * * *